United States Patent
Imoto

(10) Patent No.: US 9,156,027 B2
(45) Date of Patent: Oct. 13, 2015

(54) EXHAUST GAS CATALYST CARRIER, EXHAUST GAS CATALYST EMPLOYING THE EXHAUST GAS CATALYST CARRIER, AND METHOD OF MANUFACTURING THE EXHAUST GAS CATALYST CARRIER

(75) Inventor: Rui Imoto, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 435 days.

(21) Appl. No.: 13/518,422

(22) PCT Filed: Dec. 21, 2010

(86) PCT No.: PCT/IB2010/003469
§ 371 (c)(1),
(2), (4) Date: Jun. 22, 2012

(87) PCT Pub. No.: WO2011/077255
PCT Pub. Date: Jun. 30, 2011

(65) Prior Publication Data
US 2012/0270730 A1    Oct. 25, 2012

(30) Foreign Application Priority Data

Dec. 25, 2009 (JP) ................................. 2009-295928

(51) Int. Cl.
| | | |
|---|---|---|
| *C01F 7/02* | (2006.01) | |
| *C01G 25/02* | (2006.01) | |
| *C01G 27/02* | (2006.01) | |
| *C01G 23/04* | (2006.01) | |
| *B01J 27/24* | (2006.01) | |
| *B01J 21/06* | (2006.01) | |
| *B01J 23/44* | (2006.01) | |
| C01G 23/047 | (2006.01) | |
| B01D 53/94 | (2006.01) | |

(52) U.S. Cl.
CPC .............. *B01J 27/24* (2013.01); *B01J 21/063* (2013.01); *B01J 21/066* (2013.01); *B01J 23/44* (2013.01); *B01D 53/945* (2013.01); *B01D 2255/2092* (2013.01); *B01D 2255/20707* (2013.01); *B01D 2255/20715* (2013.01); *C01F 7/02* (2013.01); *C01G 23/047* (2013.01); *C01G 25/02* (2013.01); *Y02T 10/22* (2013.01)

(58) Field of Classification Search
CPC .......... C01F 7/02; C01G 23/047; C01G 25/02
USPC .................................. 423/608, 609, 610, 625
See application file for complete search history.

(56) References Cited

FOREIGN PATENT DOCUMENTS

| | | |
|---|---|---|
| EP | 1 036 767 A1 | 9/2000 |
| JP | 2000-327329 | 11/2000 |
| JP | 2002-316049 | 10/2002 |
| JP | 2003-305363 | 10/2003 |
| JP | 2004-167354 | 6/2004 |
| JP | 2006-160578 | 6/2006 |
| JP | 2007-229715 | 9/2007 |

OTHER PUBLICATIONS

International Search Report in International Application No. PCT/IB2010/003469; Mailing Date: Feb. 17, 2012.
Written Opinion of the International Searching Authority in International Application No. PCT/IB2010/003469; Mailing Date: Feb. 17, 2012.
Applicant's Response in International Application No. PCT/IB2010/003469 (Apr. 19, 2012).
Notification of Reason(s) for Refusal in Japanese Patent Application No. 2009-295928; Drafting Date: Dec. 13, 2011.

*Primary Examiner* — Matthew E Hoban
*Assistant Examiner* — James Fiorito
(74) *Attorney, Agent, or Firm* — Finnegan, Henderson, Farabow, Garrett & Dunner, LLP

(57) ABSTRACT

An exhaust-gas catalyst carrier made of a composite of θ-alumina and a zirconia-titania solid solution, an exhaust-gas catalyst employing the exhaust-gas catalyst carrier, and a method of manufacturing the exhaust-gas catalyst carrier are provided.

3 Claims, 10 Drawing Sheets

ACTIVITY EVALUATION PATTERN

EXHAUST GAS CATALYST CARRIER, EXHAUST GAS CATALYST EMPLOYING THE EXHAUST GAS CATALYST CARRIER, AND METHOD OF MANUFACTURING THE EXHAUST GAS CATALYST CARRIER

CROSS-REFERENCE TO RELATED APPLICATIONS

This application is a national phase application of International Application No. PCT/IB2010/003469, filed Dec. 21, 2010, and claims the priority of Japanese Application No. 2009-295928, filed Dec. 25, 2009, the content of both of which is incorporated herein by reference.

BACKGROUND OF THE INVENTION

1. Field of the Invention

The invention relates to an exhaust-gas catalyst carrier, an exhaust-gas catalyst employing the exhaust-gas catalyst carrier, and a method of manufacturing the exhaust-gas catalyst carrier. More specifically, the invention relates to an exhaust-gas catalyst carrier made of a composite of a specific alumina and a zirconia-titania solid solution that abates sulfur (S) poisoning and exhibit high NOx purification performance even after a long use, an exhaust-gas catalyst employing the exhaust-gas catalyst carrier, and a method of manufacturing the exhaust-gas catalyst carrier.

2. Description of the Related Art

Exhaust gas discharged from the internal combustion engine of a motor vehicle or the like contains HC, CO, and NOx. These substances are discharged into the atmosphere after being purified by an exhaust-gas catalyst. A three-way catalyst in which a noble metal such as platinum (Pt), rhodium (Rh), palladium (Pd) is carried on a porous oxide carrier such as, for example, alumina ($Al_2O_3$), silica ($SiO_2$), zirconia ($ZrO_2$), or titania ($TiO_2$) is a representative example of a conventional exhaust-gas catalyst that is widely used.

The three-way catalyst oxidizes and purifies HC and CO contained in exhaust gas, and reduces and purifies NOx contained in exhaust gas. The three-way catalyst exerts its highest effect in an exhaust gas of a stoichiometric atmosphere burned in the vicinity of a stoichiometric air-fuel ratio. Especially in recent years, there have been demands for an improvement in fuel consumption, and exhaust-gas catalysts are increasingly exposed to abrupt atmospheric fluctuations based on A/F fluctuations at high temperatures, due to an increase in the number of times of FC at high temperatures or the like. Such abrupt atmospheric fluctuations substantially promote a deterioration of the catalysts.

Further, although the amount of sulfur components contained in gasoline or kerosene has been reduced, it is impossible to completely remove the sulfur components. Although in small amounts, the sulfur components are inevitably contained in fuel. The sulfur components in fuel deteriorate the performance of the exhaust-gas catalysts. Thus, the development of an exhaust-gas catalyst capable of maintaining its catalytic performance under such fluctuating conditions as well is under way.

For example, Japanese Patent Application Publication No. 2002-316049 (JP-A-2002-316049) describes an exhaust-gas catalyst that is composed of catalyst particles produced by depositing ultrafine particles of a catalyst metal on the surfaces of θ-alumina particles through calcination. Further, Japanese Patent Application Publication No. 2004-167354 (JP-A-2004-167354) describes a catalyst carrier obtained by adding phosphor to a composite oxide in which an acid oxide composed of at least one of $ZrO_2$ and $TiO_2$ and $Al_2O_3$ are mixed together on a primary particle level, and an NO oxidation catalyst having a noble metal carried on this catalyst carrier. It is described that it is appropriate to set the temperature for calcinating the carrier lower than 900° C. For example, a carrier powder may be produced by calcining a precipitate that contains Al, Zr, Ti and P components, with the ratio of Zr to (Zr+Ti) equal to about 60 molar %, at 800° C. In addition, paragraph 0023 of JP-A-2004-167354 indicates that it is not preferable to set the molar ratio of zirconia to titania above 70:30 (i.e., to set the molar ratio of zirconia to (zirconia+titania) higher than 70 molar %), because doing so would reduce the heat resistance of the carrier, which would decrease the durability of the carrier.

In addition, Japanese Patent Application Publication No. 2007-229715 (JP-A-2007-229715) describes a catalyst carrier that is composed of an $Al_2O_3$—$ZrO_2$—$TiO_2$-type composite oxide with at least a portion of the $ZrO_2$ and $TiO_2$ form a $ZrO_2$—$TiO_2$ solid solution, and a catalyst that includes a noble metal and an NOx occluding material carried on this catalyst carrier. It is described that it is appropriate to set the temperature for calcining the carrier lower than 900° C. An example is described in which a carrier powder is prepared by calcining a precipitate that contains Al, Zr, and Ti components with the ratio of Zr to (Zr+Ti) equal to 70 molar % at 800° C.

However, these exhaust-gas catalysts do not exhibit sufficient catalytic performance after a long use. Therefore, there have been demands for an exhaust-gas catalyst carrier that can exhibit improved catalytic performance, and an exhaust-gas catalyst employing such an exhaust-gas catalyst carrier.

SUMMARY OF THE INVENTION

The invention provides an exhaust-gas catalyst carrier that is immune to sulfur poisoning and exhibits high catalytic performance, an exhaust-gas catalyst that employs the exhaust-gas catalyst carrier, and a method of manufacturing the exhaust-gas catalyst carrier.

An exhaust-gas catalyst carrier according to a first aspect of the invention is made of a composite of 8-alumina and a zirconia-titania solid solution.

According to the first aspect of the invention, an exhaust-gas catalyst carrier that is immune to sulfur poisoning and exhibits high catalytic performance even after a long use may be obtained.

In the exhaust-gas catalyst carrier according to the foregoing first aspect of the invention, a molar ratio of zirconia to (zirconia+titania) in the zirconia-titania solid solution may be between 70 molar % and 100 molar %.

In the exhaust-gas catalyst carrier according to the foregoing first aspect of the invention, the molar ratio of zirconia to (zirconia+titania) in the zirconia-titania solid solution may be within a range of 75 molar % to 90 molar %.

Further, an exhaust-gas catalyst according to a second aspect of the invention employs the exhaust-gas catalyst carrier according to the first aspect of the invention.

According to the second aspect of the invention, an exhaust-gas catalyst employing an exhaust-gas catalyst carrier that is immune to sulfur poisoning and exhibits high catalytic performance even after a long use can be obtained.

It should be noted that in the first aspect of the invention and the second aspect of the invention, the zirconia-titania solid solution refers to a zirconia-titania solid solution that does no have a distinct peak at 2θ=about 25° in an X-ray diffraction diagram obtained according to a measurement method that will be described in detail later.

A method of manufacturing an exhaust-gas catalyst carrier according to a third aspect of the invention is a method of manufacturing an exhaust-gas catalyst carrier made of a composite of θ-alumina and a zirconia-titania solid solution. The method includes preparing an aqueous solution containing an aluminum salt, a zirconium salt, and a titanium salt, wherein a molar ratio of zirconia to (zirconia titania) is between 70 molar % and 100 molar %, generating a precipitate from the aqueous solution by adjusting a pH of the aqueous solution to obtain a precipitate, aging the precipitate at a temperature equal to or below 200° C., and calcinating the precipitate at a temperature equal to or above 900° C. and below 1200° C. for a period of 1 to 10 hours.

According to the third aspect of the invention, an exhaust-gas catalyst carrier that is made of a composite of θ-alumina and a zirconia-titania solid solution, is immune to sulfur poisoning and exhibits high catalytic performance, even after a long use.

BRIEF DESCRIPTION OF THE DRAWINGS

The foregoing and/or further objects, features and advantages of the invention will become more apparent from the following description of an example embodiment of the invention with reference to the accompanying drawings, in which like numerals are used to represent like elements and wherein.

DETAILED DESCRIPTION OF EMBODIMENT

According to one embodiment of the invention, an exhaust-gas catalyst carrier that makes exhaust gas catalyst immune to sulfur poisoning and exhibits high catalytic performance, even after a long use, and an exhaust-gas catalyst employing such an exhaust-gas catalyst carrier are obtained by an exhaust-gas catalyst that is made of a composite of θ-alumina and a zirconia-titania solid solution. Specifically, the molar ratio of zirconia to (zirconia+titania) in the zirconia-titania solid solution higher than 70 molar % and lower than 100 molar %.

Figure 1:
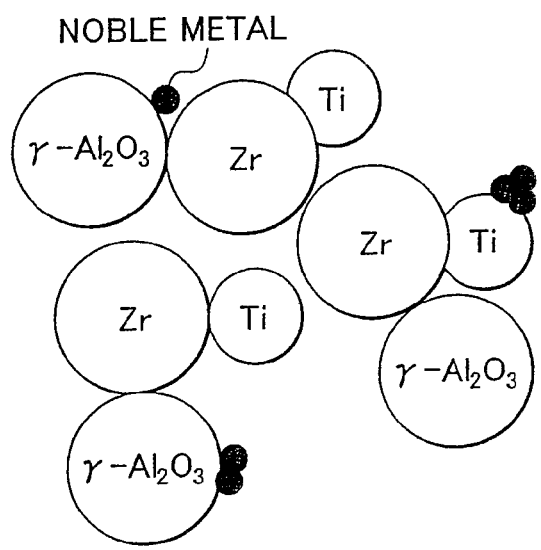
FIG. 1 is a conceptual view of an exhaust-gas catalyst that employs an exhaust-gas catalyst carrier as a type of γ-alumina and a zirconia-titania compound according to the related art.

One embodiment of the invention will be described below with reference to FIGS. 1 to 7. As shown in FIG. 1, a conventional exhaust-gas catalyst employs a compound-type exhaust-gas catalyst carrier composed of γ-alumina (denoted by γ-$Al_2O_3$ in the drawings) and zirconia (denoted by Zr in the drawings)—titania (denoted by Ti in the drawings) that contains a large amount of titania. Zirconia and titania have not turned into a solid solution. Instead, the zirconia and titania are believed to form a zirconia-titania compound (which may be denoted by $ZrTiO_4$) having a peak at 2θ=about 25° in the X-ray diffraction diagram of FIG. 3. Even if zirconia and titania contain a solid solution, the ratio of the solid solution is considered to be limited. Furthermore, a noble metal used as a catalyst component may be carried on arbitrary components in the carrier, for example, γ-alumina, the zirconia-titania compound, and titania (shown in FIG. 1 in a state of being carried on γ-$Al_2O_3$ and Ti).

Figure 2:
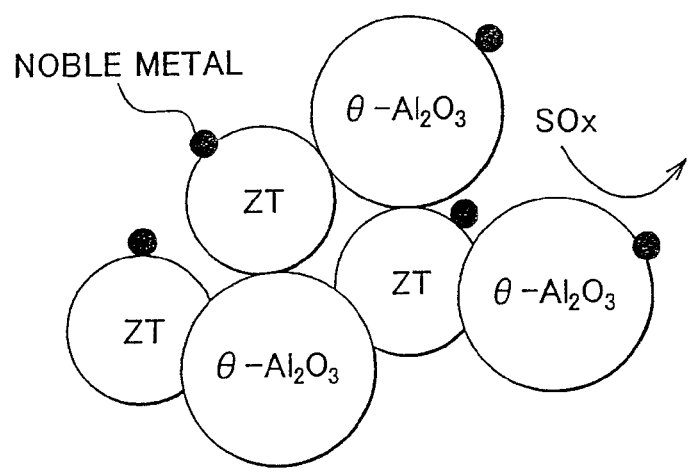
FIG. 2 is a conceptual view of an exhaust-gas catalyst that employs an exhaust-gas catalyst carrier according to one embodiment of the invention.

In contrast, as shown in FIG. 2, the exhaust-gas catalyst employing the exhaust-gas catalyst carrier according to the embodiment of the invention includes a noble metal as the catalyst component carried on a composite of θ-alumina (denoted by O—$Al_2O_3$ in the drawings) and a zirconia-titania solid solution (denoted by ZT in the drawings). In this embodiment of the invention, zirconia and titania are considered to be in a state where the entire quantity of titania has turned into a solid solution in zirconia, and thus does not have the peak at 26=about 25°, as shown in X-ray diffraction diagram of FIG. 4. Further, the noble metal catalyst component may be deposited on an arbitrary component in the carrier, for example, θ-alumina or the zirconia-titania solid solution.

Figure 3:
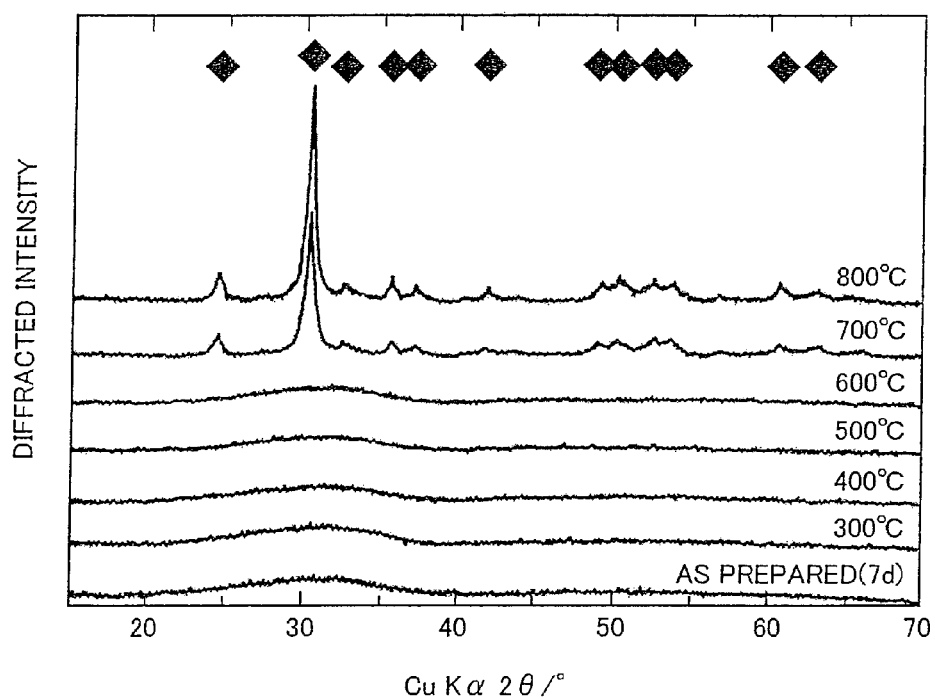
FIG. 3 is an X-ray diffraction diagram of a zirconia-titania compound in a conventional exhaust-gas catalyst carrier.
Figure 4:
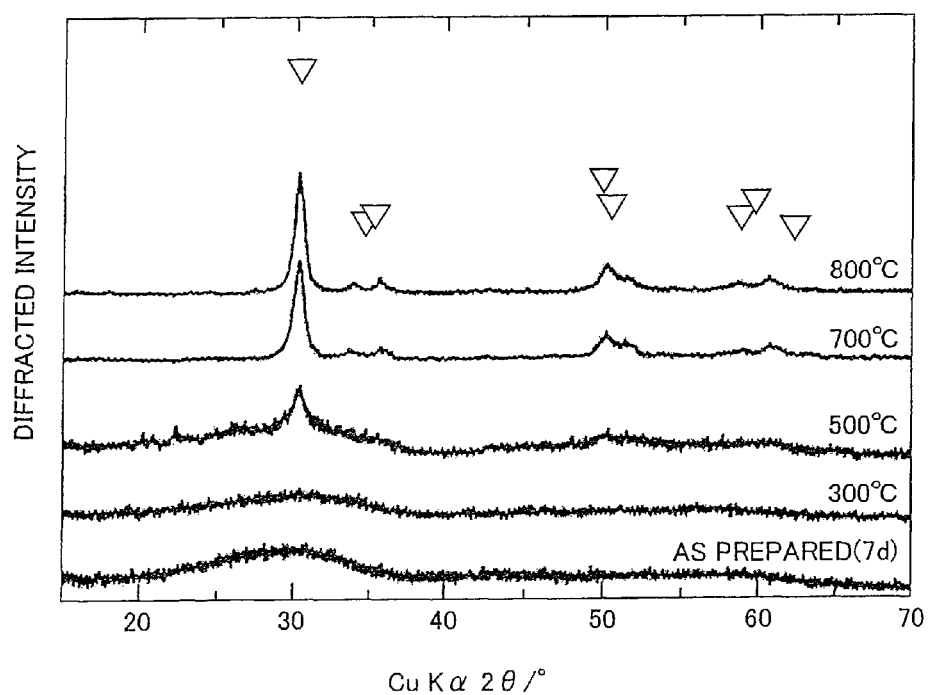
FIG. 4 is an X-ray diffraction diagram of a zirconia-titania solid solution having the same composition as in the exhaust-gas catalyst carrier according to the embodiment of the invention.

As for a condition for obtaining the zirconia-titania solid solution in this embodiment of the invention, it is understood that when the molar ratio of zirconia to (zirconia+titania) exceeds 70 molar % and the temperature of calcination (a temperature at which an aged precipitate is calcined) is equal to or higher than 700° C., all of the titania turns into a solid solution in zirconia as shown in FIG. 4, and a zirconia-titania solid solution that lacks a peak at 2θ=about 25° in the X-ray diffraction diagram, as shown in FIG. 3, is obtained. In other words, accordingly, the zirconia-titania solid solution of this embodiment may be considered a solid solution of zirconia and titania in which the entire all of the titania has turned into a solid solution in zirconia and has no peak at 2θ=about 25° in the X-ray diffraction diagram thereof.

Figure 5:
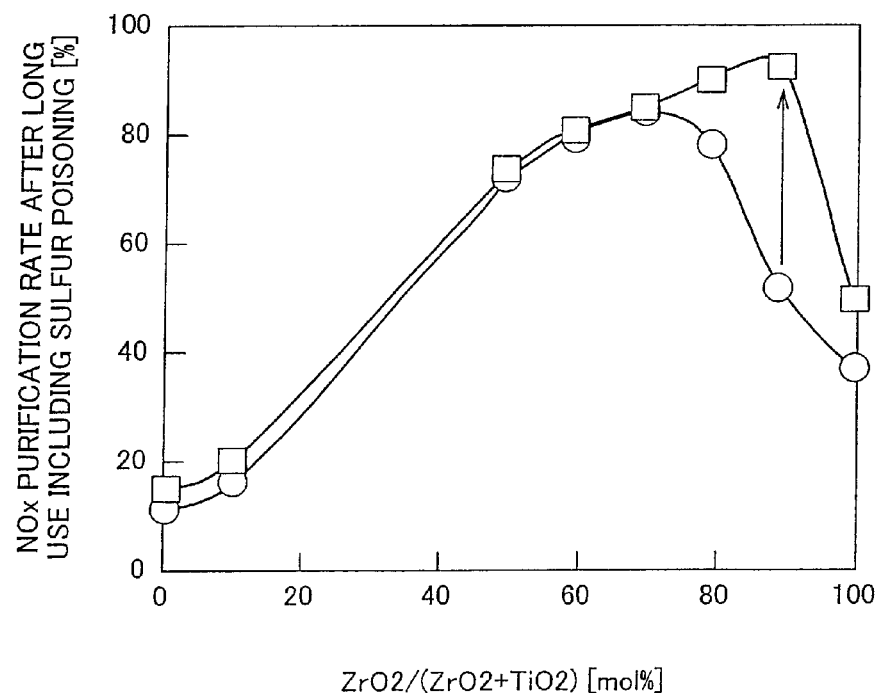
FIG. 5 is a graph comparing the NOx purification rates of exhaust-gas catalysts obtained according to examples of the invention and comparative examples after a long use including sulfur poisoning and the ratios of Zr to (Zr+Ti) in exhaust-gas catalyst carriers.

In a conventional exhaust-gas catalyst composed of γ-alumina and zirconia-titania, if the molar ratio of zirconia to (zirconia+titania) in the carrier exceeds 70 molar % as indicated by circles in FIG. 5, the NOx purification rate of the exhaust-gas catalyst after an sulfur poisoning treatment and a durability treatment is about 80 to 50%, and is substantially lower than when the molar ratio is 70%. However, the exhaust-gas catalyst that employs the composite of θ-alumina and the zirconia-titania solid solution according to the embodiment of the invention demonstrates good resistance against sulfur poisoning and high catalytic performance with the NOx purification rate after the sulfur poisoning treatment and the durability treatment being higher than about 80% and lower than about 90% if the molar ratio of zirconia to (zirconia+titania) in the zirconia-titania solid solution is between 70 molar % and 100 molar %, especially within a range of 75 to 90 molar %, as indicated by squares in FIG. 5.

Figure 6:
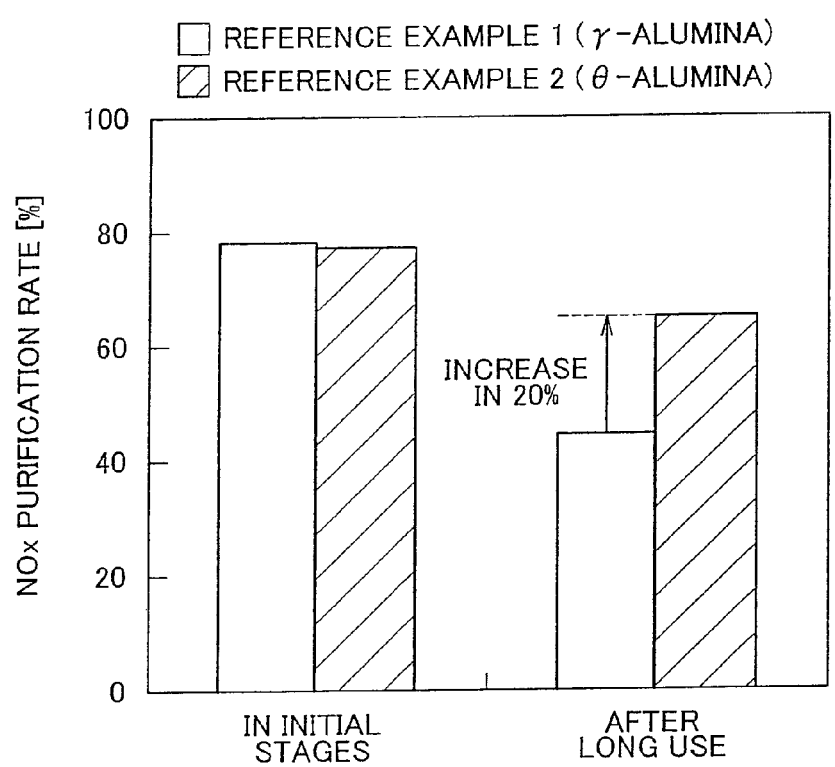
FIG. 6 is a graph comparing the activities of Pd/alumina with various kinds of alumina.
Figure 7:
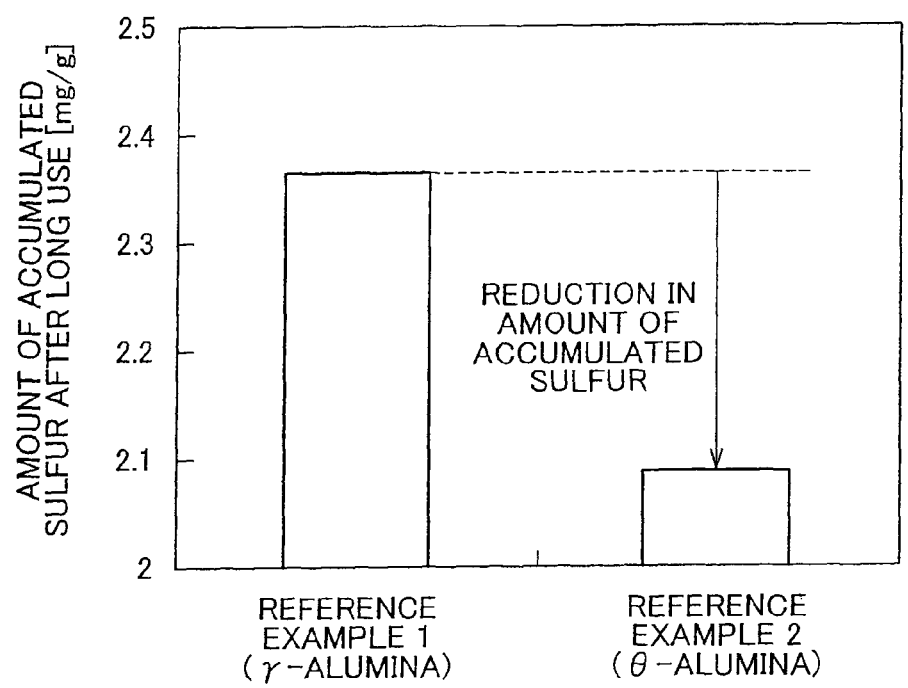
FIG. 7 is a graph comparing the amounts of accumulated sulfur of Pd/alumina with various kinds of alumina.

The reason why an exhaust-gas catalyst containing the composite of θ-alumina and the zirconia-titania solid solution according to the invention demonstrates better reduction of sulfur poisoning and higher catalytic performance after the sulfur poisoning treatment and the durability treatment than the conventional exhaust-gas catalyst has not been theoretically elucidated. Presumably, however, the reason is due to the change of alumina from γ-type to θ-type which decreases the specific surface and maintains a high purification rate as shown in FIG. 6, and also reduces the accumulation of sulfur as shown in FIG. 7 and the sintering of titania is suppressed due to the formation of a solid solution of titania, which is not susceptible to sulfur poisoning but may reduce heat resistance, with zirconia.

The exhaust-gas catalyst carrier according to the embodiment of the invention is formed as a composite of θ-alumina and the zirconia-titania solid solution. The composite of θ-alumina and the zirconia-titania solid solution may be obtained according to a method of separately producing θ-alumina and the zirconia-titania solid solution and milling both components to obtain a mixed powder. Alternatively, the composite of θ-alumina and the zirconia-titania solid solution may be obtained by, for example, generating a precipitate from an aqueous solution containing an aluminum salt, a zirconium salt, and a titanium salt with the zirconium salt and the titanium salt having a composition molar ratio (preferably the molar ratio of zirconia to (zirconia+titania) is higher than 70 molar % and lower than 100 molar %, especially 75 to 90 molar %) that can give the zirconia-titania solid solution through a later-described calcination process, by dint of a pH adjuster, aging the precipitate (e.g., drying (aging) the precipitate at a temperature equal to or lower than 200° C.) under an aging condition that can give a precursor of θ-alumina (e.g., bayerite-type hydrated alumina (hereinafter abbreviated as bayerite)), and calcinating the aged precipitate under a calcination condition (e.g., at a temperature equal to or above 900° C. and below 1200° C., especially between 900 and 1100° C. for a period of 1 to 10 hours (e.g., about 3 to 10 hours)) that can give θ-alumina and cannot give α-alumina. If the calcination temperature is below 900° C., for example, equal to 800° C., bayerite is formed, which thereby interferes with the formation of θ-alumina, and leads to the formation of γ-alumina. Further, if calcination is carried out at a temperature above 1200° C., α-alumina is formed.

The exhaust-gas catalyst according to the invention has a catalytically active component such as a noble metal carried on the exhaust-gas catalyst carrier. At least one of a noble metal and a transition metal may be used as the catalytically active component. At least one element selected from a group of Pt, Pd, Rh, and Ir may be used as the noble metal. If a transition metal is used as the catalytically active component, for example, Ni or the like may be used instead.

In the exhaust-gas catalyst according to the embodiment of the invention, the catalyst is trapped in the carrier; however addition functional components may also be contained in the carrier. An oxygen absorbing/discharging material, for example, a ceria composite oxide, may be employed as one of the addition functional components. A secondary particle of a solid solution composed of three elements, namely, Ce, Zr and O, and a secondary particle of a solid solution composed of a rare earth element such as Y or Nd in addition to Ce, Zr and O may be used as the ceria composite oxide. The amount of the rare earth element such as Y, Nd, or the like may be equal to or below 0.2 atoms for one atom of Ce and Zr altogether, for example, within a range of 0.01 to 0.2 atoms, especially 0.025 to 0.15 atoms.

Further, the exhaust-gas catalyst according to the embodiment of the invention is obtained by depositing the catalyst on a catalyst substrate, such as a honeycomb or the like, in combination with another component through embrocation or the like. The honeycomb used as the catalyst substrate may be formed of a ceramic material such as cordierite or the like, a stainless steel, or the like. Further, the exhaust-gas catalyst according to the embodiment of the invention may also be used after being molded into an arbitrary shape.

An NOx occluding material can be mentioned as the another component. The NOx occluding material occludes and discharges NOx, and may contain at least one or more alkaline metal elements, alkaline rare earth elements, or rare earth elements. The NOx occluding material, for example, Ba, K or Li can further be deposited on the oxygen adsorbent that carries the catalytically active component. Alternatively, the NOx occluding material may be carried on a functional member other than the oxygen adsorbent and used in combination with the oxygen adsorbent. The exhaust-gas catalyst according to the invention is obtained by depositing the catalytically active component and the NOx occluding material on the oxygen adsorbent or a functional member other than the oxygen adsorbent.

Examples of the invention will be described below together with comparative examples. The following examples are for illustrative purposes only and are not intended to limit the invention. In each of the following examples, the properties of a composite, an exhaust-gas catalyst carrier, and an exhaust-gas catalyst and the performance of the catalyst are evaluated in accordance with the treatment method described below and a measurement method shown below. It should be noted that the treatment method and the measurement method are not limited to those described below but may obviously be carried out in the same manner as those methods considered to be equivalent by those skilled in the art.

Figure 8:
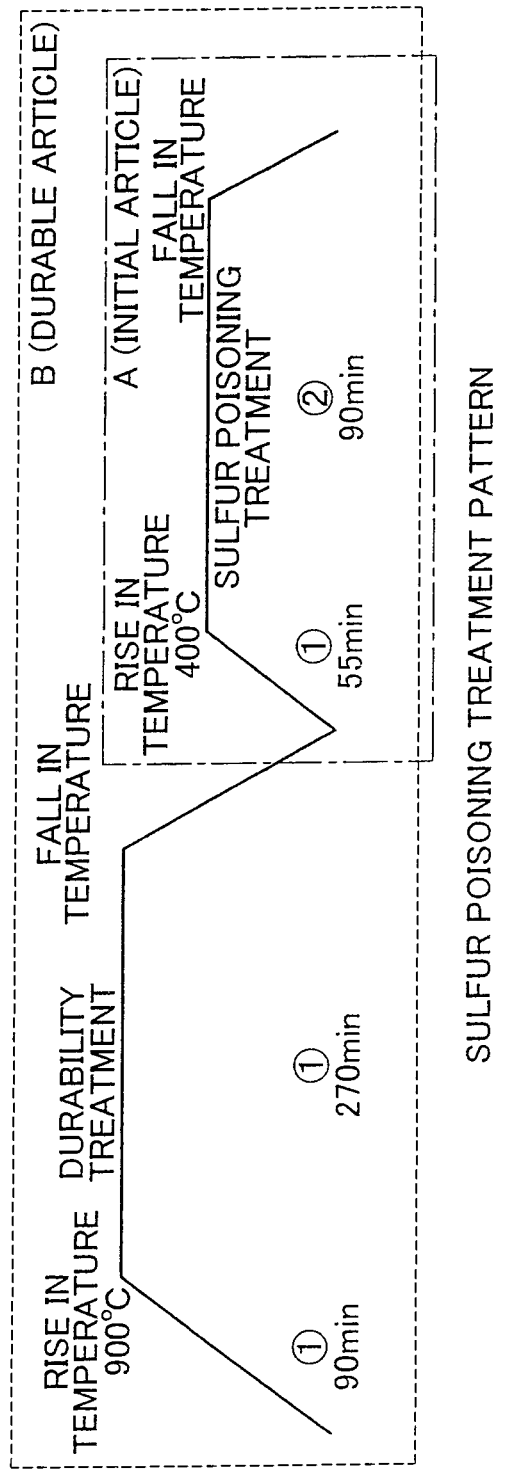
FIG. 8 shows the treatment pattern of a durability treatment and a sulfur (S) poisoning treatment for the exhaust-gas catalysts obtained according to the examples of the invention and the comparative examples.

First, an X-ray diffraction measurement was carried out for each sample. In this case, an X-ray diffraction device (RAD-B) (Rigaku Corporation) is employed as a measurement device. A pellet of 3 g was subjected to a durability treatment and an sulfur poisoning treatment (an article in the initial stages: A in FIG. 8, an article after a long use: B in FIG. 8) with gas compositions shown below and a temperature rise/temperature fall treatment pattern shown in FIG. 8.

Figure 9:
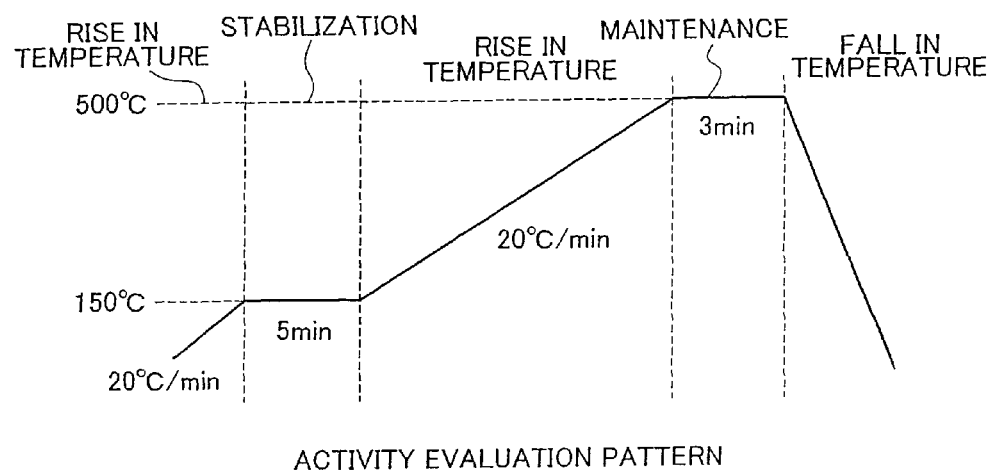
FIG. 9 is a view showing activity evaluation patterns of the exhaust-gas catalysts obtained according to the examples of the invention and the comparative examples after the sulfur poisoning treatment.
Figure 10:
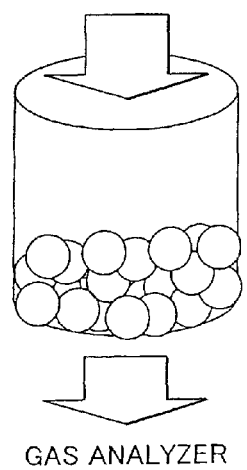
FIG. 10 is an experimental schematic view for evaluating the catalytic activities of the exhaust-gas catalysts obtained according to the examples of the invention and the comparative examples.

Sulfur Poisoning Treatment Gas Concentration (%)
(1) NO: 0.1, CO: 0.65, $C_3H_6$: 0.1, $CO_2$: 10, $O_2$: 0.725, $H_2O$: 3, $SO_2$: —, $N_2$: the rest
(2) NO: 0.1, CO: 0.65, $C_3H_6$: 0.1, $CO_2$: 10, $O_2$: 0.725, $H_2O$: 3, $SO_2$: 0.05, $N_2$: the rest Next, the amount of accumulated sulfur in each sample subjected to the sulfur poisoning treatment was measured using a C—S meter (a carbon-sulfur analyzer). The C—S meter employed herein was manufactured by Horiba Seisakusho Corporation. Then the stoichiometric activity was evaluated according to an activity evaluation pattern of temperature increase, temperature maintenance, and temperature decrease as shown in FIG. 9 under a condition shown below by a model gas device shown in FIG. 10, as to each of the catalysts subjected to the sulfur poisoning treatment. It should be noted that each sample has a gas flow rate of 15 L/min for 3 g.

Evaluation of Catalytic Activity Gas Concentration (%) (Stoichiometric)

NO: 0.15, CO: 0.74, $C_3H_6$: 0.1, $CO_2$: 10.2, $O_2$: 0.75, $H_2O$: 3, $N_2$: the rest Pd as a noble metal is deposited on γ-alumina (a carrier) at a ratio of 0.5 wt % using Pd nitrite according to a evaporation dryness method, dried at 120° C., and calcinated at 60° C. for two hours to create a pellet. The initial NOx purification rate and the amount of accumulated sulfur after a long use were evaluated as to an exhaust-gas catalyst thus obtained. The result is shown in FIGS. 6 and 7 as Reference Example 1 in conjunction with other results.

Pd was deposited on θ-alumina (the carrier) at a ratio of 0.5 wt % using Pd nitrite according to the evaporation dryness method, dried at 120° C., and calcinated at 600° C. for two hours to create a pellet. The initial NOx purification rate and the amount of accumulated sulfur after a long use were evaluated as to the exhaust-gas catalyst thus obtained. The result is shown in FIGS. 6, 7, 11 and 12 as Reference Example 2 in conjunction with other results.

It is understood from FIG. 6 that γ-alumina and θ-alumina are equivalent to each other in initial performance, but that θ-alumina maintains a higher purification rate than γ-alumina over time. This is believed to be due to the decrease in specific surface is unlikely to occur in θ-alumina and the noble metal is unlikely to be sintered. It is understood from FIG. 7 that sulfur is more unlikely to be accumulated in θ-alumina than in γ-alumina.

Figure 11:
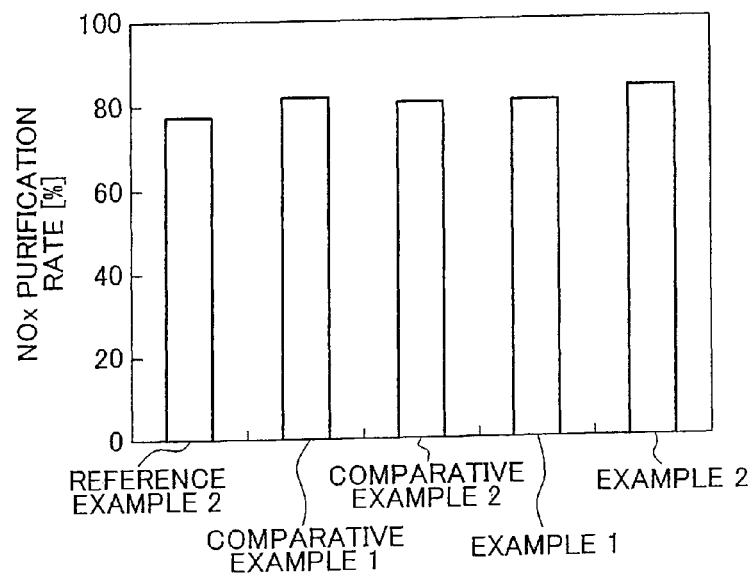
FIG. 11 is a graph comparing the NOx purification rates of initial articles of the exhaust-gas catalysts obtained in the examples of the invention and the comparative examples.
Figure 12:
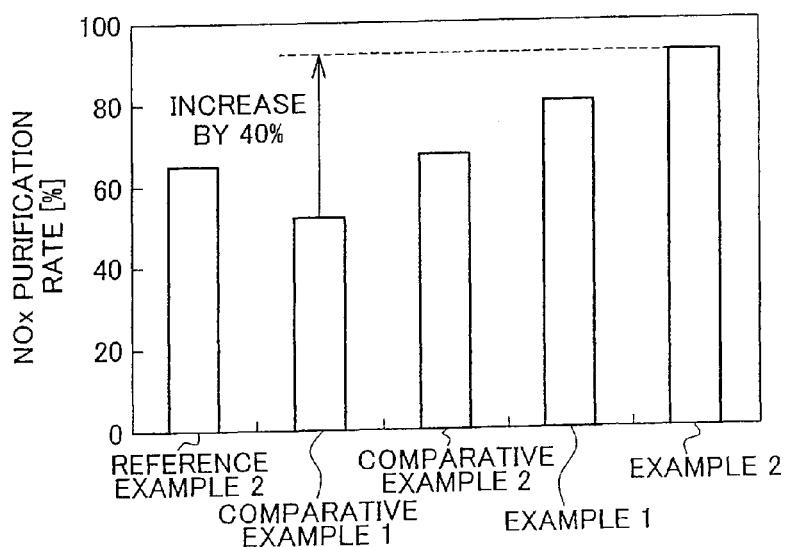
FIG. 12 is a graph comparing the NOx purification rates of the exhaust-gas catalysts according to the invention with those of the comparative examples after a long use including sulfur poisoning.

A raw aqueous solution containing a titanium salt (titanium tetrachloride) and a zirconium salt (zirconium oxynitride) was prepared at a molar ratio of zirconia to (zirconia+titania) equal to 90 molar %. While stirring the solution, a pH adjuster (e.g., aqueous ammonia) is added thereto to generate a precipitate, which was filtered and washed, dried at 120° C., and calcinated at 900° C. for five hours to obtain a powder. The powder was milled with θ-alumina at a ratio of 50 wt % to obtain a mixed powder. Pd as the noble metal is deposited on the mixed powder at a ratio of 0.5 wt % using Pd nitride according to the evaporation dryness method, dried at 120° C., and calcinated at 600° C. for two hours to create a pellet. The exhaust-gas catalyst thus obtained was evaluated. The result is shown in FIGS. 11 and 12 as Example 1, in conjunction with other results.

In the same manner as in Example 1 except in that θ-alumina is not contained, a precipitate whose molar ratio of zirconia to (zirconia+titania) is equal to 90 molar % was generated, and the calcination temperature was changed from 300° C. to 500° C., 700° C. and then 800° C. to obtain pellets. An X-ray diffraction measurement was carried out as to these pellets. The results are comprehensively shown in FIG. 4.

A basic aqueous solution containing a titanium salt (titanium tetrachloride), a zirconium salt (zirconium oxynitride) and an aluminum salt (aluminum nitride) having a molar ratio of zirconia to (zirconia+titania) equal to 90 molar % and with the ratio of 8-alumina to the entire carrier equal to 50 wt % was prepared. While stirring the solution, the pH adjuster (aqueous ammonia) was added thereto to generate a precipitate. After being filtered and washed, the precipitate was aged at a temperature below 80° C. to generate bayerite, which is a precursor of alumina. The bayerite was calcinated at 900° C. for five hours to obtain a powder. Pd as the noble metal is deposited on the powder at a ratio of 0.5 wt % using Pd nitride according to the evaporation dryness method. The powder carrying Pd was dried at 120° C. and then calcinated at 600° C. for two hours to create a pellet. The resulting exhaust-gas catalyst was evaluated. The result is shown in FIGS. 5, 11, and 12 as Example 2 in conjunction with other results.

A powder having a molar ratio of zirconia to (zirconia+titania) equal to 80 molar % and a 50 wt θ-alumina mass ratio was produced in the same manner as described in Example 2. Pd as the noble metal was deposited on the powder at a ratio of 0.5 wt % using Pd nitride according to the evaporation dryness method. The powder carrying Pd was dried at 120° C., and calcined for two hours at 600° C. to create a pellet. The resulting exhaust-gas catalyst was then tested. The result is shown in FIG. 5 as Example 3 in conjunction with other results.

A basic aqueous solution containing a titanium salt (titanium tetrachloride), a zirconium salt (zirconium oxynitride), and an aluminum salt (aluminum nitride) with the molar ratio of zirconia to (zirconia+titania) equal to 90 molar % and with the ratio of γ-alumina to the whole equal to 50 wt % was prepared. While stirring the solution, the pH adjuster (aqueous ammonia) was added thereto to generate a precipitate, which was filtered and washed, dried at 120° C., and calcinated at 800° C. for five hours to obtain a powder. Pd as the noble metal is deposited on the powder at a ratio of 0.5 wt % using Pd nitride using the evaporation dryness method. The powder having Pd carried thereon was dried at 120° C. and calcinated at 600° C. for two hours to create a pellet. The resulting exhaust-gas catalyst was evaluated. The result is shown in FIGS. 5, 11, and 12 as Comparative Example 1 in conjunction with other results.

In the same manner as in Comparative Example 1 except in that γ-alumina is not contained, a precipitate whose molar ratio of zirconia to (zirconia+titania) is equal to 90 molar % was generated and calcined at 300° C. to 400° C., 500° C., 600° C., 700° C. and 800° C. to create pellets. An X-ray diffraction measurement was carried out on the resulting pellets. The results are comprehensively shown in FIG. 3.

A mixed powder having a molar ratio of zirconia to (zirconia+titania) equal to 90 molar % and a mass ratio of 50 wt % θ-alumina was obtained by milling powders of θ-alumina, zirconia, and titania. Pd as the noble metal is deposited on the mixed powder at a mass ratio of 0.5 wt % using Pd nitride according to the evaporation dryness method. The mixed powder carrying Pd is dried at 120° C. and calcinated at 600° C. for two hours to create a pellet. An initial NOx purification rate and the amount of accumulated sulfur after a long use were evaluated as to the exhaust-gas catalyst thus obtained. The result is shown in FIGS. 11 and 12 as Comparative Example 2 in conjunction with other results.

Several powders having molar ratios of zirconia to (zirconia+titania) of 0 molar %, 10 molar %, 50 molar %, 60 molar %, 70 molar % and 100 molar % were prepared in the same manner as described in Example 1. A pellet was prepared using the resulting powder in the same manner as in Example 2. The resulting exhaust-gas catalyst was then tested. The result is shown in FIG. 5 as Example 4 in conjunction with other results.

Several powders having molar ratios of zirconia to (zirconia+titania) of 0 molar %, 10 molar %, 50 molar %, 60 molar %, 70 molar %, 80 molar % and 100 molar % were prepared in the same manner as described in Example 1. A pellet was prepared using the resulting powder in the same manner as in Comparative Example 1. The resulting exhaust-gas catalyst was evaluated. The result is shown in FIG. 5 as Comparative Example 3 in conjunction with other results.

As is apparent from FIGS. 5 to 12, the conventional exhaust-gas catalyst according to Comparative Example 1, which contains γ-alumina and a zirconia-titania compound and is produced from a carrier having a distinct peak at 2θ=about 25° in the X-ray diffraction diagram of FIG. 3, exhibits a low NOx purification rate after the sulfur poisoning treatment and the durability treatment as shown in FIG. 5. The NOx purification rate is substantially lower than that of a catalyst that has a molar ratio of zirconia to (zirconia+titania) equal to 70 molar %. In contrast, as shown in FIGS. 5 and 12, the exhaust-gas catalysts of Example 2 and Example 3, which are composed of θ-alumina and the zirconia-titania solid solution and produced from the composite having no peak at 2θ=about 25° in the X-ray diffraction diagram of FIG. 3, exhibits significantly improved in NOx purification activity with the NOx purification rate after the sulfur poisoning treatment and the durability treatment higher than about 80% and equal to or lower than about 90%, and thereby demonstrating improved resistance to sulfur poisoning and high catalytic performance.

A ceria-type oxide having a $CeO_2$:$ZrO_2$ mass ratio of 60:40 was mixed in equal amounts with the catalyst prepared in accordance with Example 1 or Example 2 to obtain a pellet. The oxygen occluding/discharging capacity of the resulting catalyst was measured using the method described below. In the oxygen adsorption capacity measurement method 3 g of the created pellet are used, first a mass flow controller executes a control to set the total flow rate to 20 L/min and raise the temperature to 500° C. on an $N_2$ balance, and then an $O_2$ 1%/$N_2$ balance is introduced for a minute. After the $O_2$ 1%/$N_2$ balance has been introduced for a minute, $N_2$ is introduced for 30 seconds. A $CO_2$ generation amount (ratio) is calculated from the $CO_2$ concentration when the introduction of a CO/$N_2$ balance for a minute, and then the oxygen occluding/discharging capacity is measured. The results obtained are shown in FIG. 13 as Examples 5 and 6 in conjunction with other results.

A ceria-type oxide having a $CeO_2$:$ZrO_2$ mass ratio of 60:40 was mixed in equal amounts with the catalyst prepared in accordance with Comparative Example 1 or Comparative Example 2 to obtain a pellet. The oxygen occluding/discharging capacity of the resulting catalyst was measured in the same manner as described above. The results are shown in FIG. 13 as Comparative Examples 4 and 5 in conjunction with other results.

Figure 13:
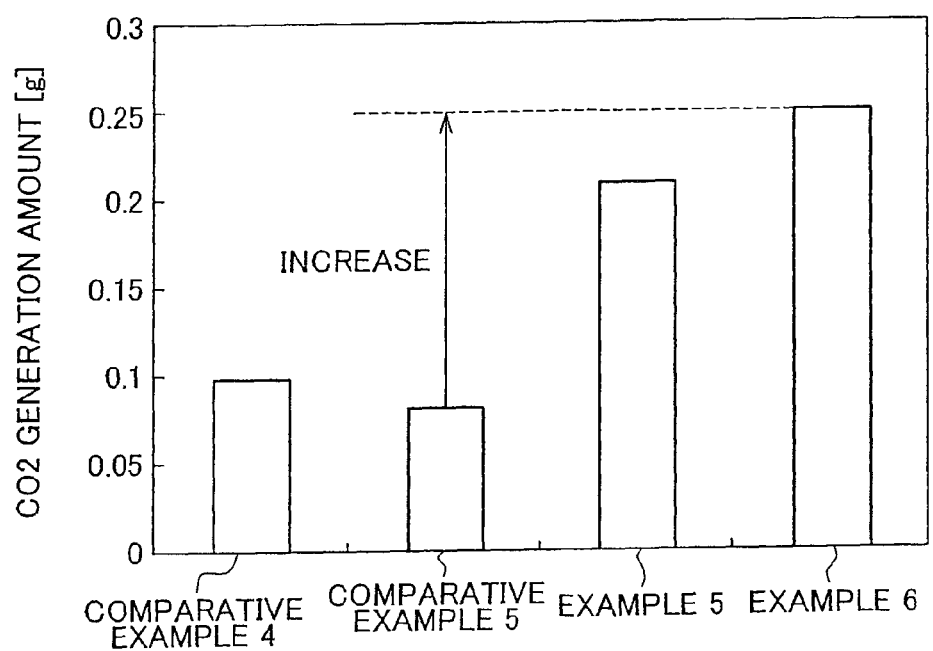
FIG. 13 is a graph showing for comparison oxygen occlusion/discharge capacities of exhaust-gas catalysts prepared by compounding the exhaust gas control catalysts obtained in the examples of the invention and the comparative examples further with a ceria compound.

As is apparent from FIG. 13, the exhaust-gas catalysts according to Example 5 and Example 6 exhibit improved oxygen adsorption capacity. It is believed that the suppression of the movement of titania by ceria-type oxides in a solid solution contributes to the improvement in adsorption capacity.

According to the invention, an exhaust-gas catalyst carrier that is immune to sulfur poisoning and exhibits high NOx purification performance even for an exhaust gas from a motor vehicle or the like that discharges an exhaust gas containing sulfur components can be obtained. Further, the exhaust-gas catalyst according to the invention makes it possible to purify an exhaust gas stably.

The invention has been described with reference to the example embodiment thereof for illustrative purposes only. It should be understood that the description is not intended to be exhaustive or to limit the form of the invention, and that the invention may be adapted for use in other systems and applications. The scope of the invention embraces various modifications and equivalent arrangements that may be conceived by one skilled in the art.

The invention claimed is:

1. A method of manufacturing an exhaust-gas catalyst carrier the carrier comprising a composite of θ-alumina and a zirconia-titania solid solution, the method comprising:
    preparing an aqueous solution of an aluminum salt, a zirconium salt, and a titanium salt, wherein a molar ratio of zirconia to the sum of zirconia and titania is between 80 molar % and 90 molar %;
    generating a precipitate from the aqueous solution by adjusting a pH of the aqueous solution to obtain a precipitate;
    aging the precipitate at a temperature equal to or below 200° C.; and
    calcinating the precipitate at a temperature equal to or above 900° C. and lower than 1200° C. for a period of 1 to 10 hours.

2. A method of manufacturing an exhaust-gas catalyst carrier according to claim 1, wherein the precipitate is calcinated for a period of 3 to 10 hours.

3. A method of manufacturing an exhaust-gas catalyst carrier according to claim 1, wherein the precipitate is calcinated at a temperature of higher than 900 and equal to or lower than 1100° C.

* * * * *